Dec. 30, 1924.
B. R. BLACKWELDER
TIRE MATERIAL
Filed Aug. 19, 1920
1,520,925
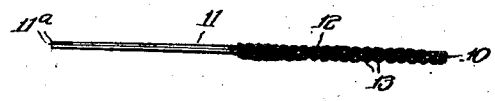
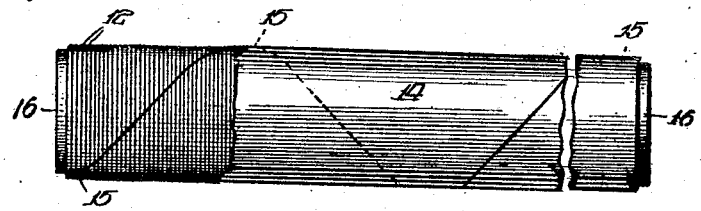
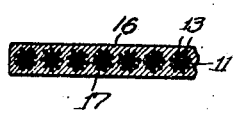
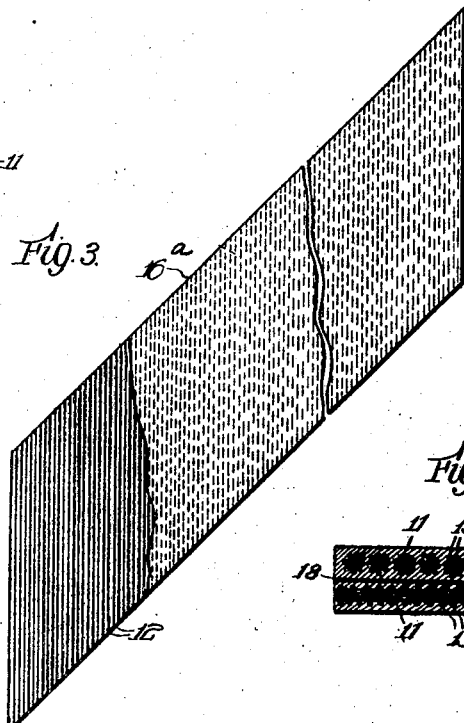
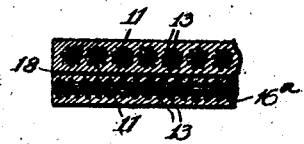
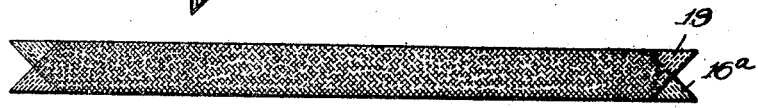
Inventor:
Bert R. Blackwelder
By Wilkinson, Huxley, Byron & Knight
Attys.
Witness:

Patented Dec. 30, 1924.

1,520,925

UNITED STATES PATENT OFFICE.

BERT R. BLACKWELDER, OF LAPORTE, INDIANA.

TIRE MATERIAL.

Application filed August 19, 1920. Serial No. 404,627.

*To all whom it may concern:*

Be it known that I, BERT R. BLACKWELDER, a citizen of the United States, residing at Laporte, in the county of La Porte and State of Indiana, have invented certain new and useful Improvements in Tire Material, of which the following is a specification.

My invention relates to material for use in making automobile tires of the type known as cord tires and has particular reference to the manufacture of the cords used in making the fabric and also in the tires, process of making the cords and the fabric which is fashioned into the tire casings or carcasses.

The principal object of my invention is the provision of cords having metallic centers or cores therein, the said cores being covered with a frictioning material and then having a covering of cotton, wool, or other suitable material woven or braided thereon, the metallic cores being preferably made up of a number of small strands of wire braided, woven or twisted together, or otherwise fabricated into the form of a single cord and these individual cords are then fashioned into a fabric which is used in the manufacture of the tire carcass, or, if preferred, these cords may be woven together in the form of a tire carcass in the usual manner without first being woven into a fabric.

I am aware that various methods have heretofore been used and that tires have heretofore been manufactured having metallic reinforcing members in the walls thereof and in the thread surfaces of the tires, but such tires have not proven satisfactory in service because the tires become so hot in service that the fabric and rubber is destroyed. By my improved method of frictioning the surfaces of the metallic cores and then further covering them individually with fabric, I am able to provide a strong and durable tire, and one which will run cooler in service than the ordinary fabric or cord tire.

Another and further object of my invention is the provision of a material for use in making a tire which will have a maximum amount of strength, thereby preventing blowouts and making a strong and durable tire without in any way losing any of the resiliency common to pneumatic tires.

Another and further object of my invention is the provision of a material for making automobile tires which have a metallic reinforcement built up in such a manner that the metallic centers of the cords are separated from each other so that no heat will be developed because of the friction of the metallic cores upon each other, each wire or core having a covering so strong that it will withstand a maximum amount of wear without destroying the fabric. Furthermore, the cords making up the fabric are also slightly separated so that there will be no opportunity for heat being developed due to the friction of the cords one against the other, which is a common fault of cord tires.

Another and further object of my invention is the provision of a cord tire fabric having cords made up of metallic centers which extend completely around the tire surface, so that heat being developed along the tread surface of the tire, the metallic centers of the cords act as heat conductors, distributing the heat over the entire surface of the tire, thereby allowing the heat to pass off into the air along the sides of the tire as the car is running.

These and other objects of my invention will be more fully and better understood by reference to the accompanying sheet of drawings, in which—

Figure 1 is a single strand showing the metallic center and the fabric woven thereon;

Figure 2 is a view partially in elevation and partially in section of a mandrel or drum upon which the cords are wound;

Figure 3 is a view partially in section of a single strip of material after being removed from the drum or mandrel shown in Figure 2;

Figure 4 is a view showing two strips of the material superimposed upon each other showing the direction of travel of the cords through the material;

Figure 5 is a small sectional view taken at right angles through the fabric showing the cords having metallic centers with a layer of rubber fabric on each side thereof; and Figure 6 is a sectional view through the strip of material shown in Figure 4.

Referring now specifically to the drawings, and in which like reference characters refer to like parts throughout, and specifically to Figure 1 wherein is shown a single strand or cord 10 composed of a metallic center 11 of wire, preferably composed of a number of small strands of wire 11ª, woven or twisted into a single strand 10 and having a fabric covering 12 braided thereon, the said covering being made up of a number of strands of material 13. In preparing the strand 10 the metallic center 11 is passed through a proper frictioning material, such as rubber or the like, so that a very thin coating of this material adheres to the surface of the cord 11, and also fills up the tiny openings and spaces between the strands, and is then passed through a braiding machine which braids the cover 12 thereon. Thereupon the cords 10 are wound about a mandrel or drum 14, each cord being held under a predetermined tension until the drum 14 is entirely covered with the cords, the said mandrel 14 having a groove 15 extending from one end to the other of the mandrel, the said groove extending across the surface of the mandrel 14 at an angle of approximately 45 degrees. Thereupon a sheet of rubber fabric or skin coat 16, shown in Figure 5, is wound over the cords 12 upon the mandrel 14, completely covering the cords 12 which have been wound upon the mandrel 14. Thereupon the cords 12 and the material 16 are cut along the groove 15 on the drum and the completely formed strip of tire fabric 16a thereupon removed from the mandrel or drum 14 in the form shown in Fig. 3. Thereupon another layer of rubber fabric or skin coat 17 is secured to the sheet 16a upon the side thereof which was next to the surface of the mandrel 14 so that a sheet, a small section of which is shown in Figure 5, is formed and having the cords extending therethrough at an angle of approximately 45 degrees, as shown in Figure 3. The strip 16a is thereupon placed upon a core and is spun or otherwise molded down onto the surface of the core in the usual manner of making fabric tires. In small tires, the tire beads are then placed in position on the tire core and over the first ply. Thereupon a layer of cushion or skin coat 18 (Figure 6) is placed upon the fabric and spun down into position upon the core. A second layer 19 of fabric is then spun down over the first layer 17a and the skin coat 18 and over the beads, the ends of the second layer being reversed so that the cords in each of the layers 16a and 19 will cross each other from side to side of the tire carcass at a right angle to each other and at an agle of approximately 45 degrees to the vertical plane of the tire carcass. In making larger size tires where it is desired to use more layers of the material than two, this can also be done, reversing each succeeding layer as they are superimposed upon each other in the formation of the tire carcass so that the strands of each superimposed layer extend across the adjacent layer at right angles to each other. After the breaker strips and tread surfaces are placed upon the tire carcass in the usual manner, the whole is vulcanized in the usual way to form a complete tire.

While I have described the method and process practiced in making up a fabric composed of the metallic centered cords, I do not wish to be understood as limiting myself to this particular method, as the cords may be woven directly upon a core or into a carcass in the usual manner.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. A tire fabric comprising in combination metallic strands, frictioning material applied to said strands, a fabric covering for said strands, and a rubber covering within which said strands are embedded.

2. A tire fabric comprising in combination metallic strands, rubber applied to said strands, a fabric covering woven around the said strands and layers of said rubber applied upon each side of the said strands whereby a sheet fabric is formed.

Signed at Laporte, Indiana, this 14th day of August, 1920.

BERT R. BLACKWELDER.